United States Patent Office 2,923,733
Patented Feb. 2, 1960

2,923,733
PROCESS FOR SEPARATING PRIMARY FROM SECONDARY ALCOHOLS

Scott W. Walker, Tulsa, Okla., assignor to Pan American Petroleum Corporation, Tulsa, Okla., a corporation of Delaware No Drawing. Application March 28, 1957
Serial No. 648,991

5 Claims. (Cl. 260—475)

My invention relates to a method for separating primary alcohols from close boiling secondary alcohols. More particularly, it is concerned with recovering separate alcohol streams one of which is rich in secondary alcohols and the other rich in primary alcohols.

Typical alcohol mixtures from which separate concentrated streams of secondary and primary alcohols can be secured in accordance with my invention are those found in the hydrocarbon phase produced by the reaction of carbon monoxide with hydrogen in the presence of an alkali promoted iron catalyst. The alcohol fraction obtained from the aforesaid hydrocarbon phase contains a mixture of oxygenated organic chemicals including acids, esters, alcohols and carbonyls. The chemicals as a group are removed from the hydrocarbon mixture thereof by first neutralizing the acids present through the addition of a suitable caustic solution. On contact of the hydrocarbon mixture with the caustic the acids present pass into an aqueous phase as the corresponding caustic salts. Salt solutions of this type may then be used to extract nonacid chemicals, including alcohols, from an acid-free hydrocarbon synthesis oil. The extract thus obtained is next subjected to a stripping operation to remove the chemicals from the aqueous salt extractant, the chemicals being collected overhead. Further separation of these chemicals into classes may be effected by various purification and distillation methods now generally known to the art.

In alcohol mixtures of the type recovered from the hydrocarbon phase produced during hydrocarbon synthesis, 70 to 75 percent of these alcohols are to be found in the $C_5$ to $C_8$ molecular weight range. Of this fraction approximately 15 to 30 percent are secondary alcohols. Separation of individual alcohols from such mixtures is complicated not only by the fact that in some cases primary and secondary alcohols of the same carbon content boil too close to one another to separate by ordinary fractionation, but certain secondary alcohols boil too close to the next lower primary alcohols to be readily separated from one another. The complexity of the separation of such mixtures is seen from representative alcohols listed below.

| Alcohol: | Boiling point, °C. |
|---|---|
| 1-pentanol | 137.8 |
| 2-pentanol | 132.1 |
| 1-hexanol | 157.2 |
| 2-hexanol | 140 |
| 1-heptanol | 176 |
| 2-heptanol | 160.4 |
| 2-octanol | 178.5 |

In preparing esters of phthalic acid the reaction involved occurs in two definite steps as illustrated below:

(1) 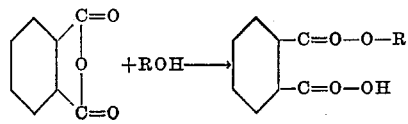

(2) 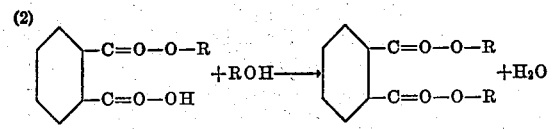

In the first reaction the anhydride ring opens to add on the R group of the alcohol to one of the potential carboxyl groups, while the OH portion of the alcohol adds directly to the remainder of the anhydride structure converting it to a free carboxyl group. The reaction represented in Equation 1 generally proceeds under relatively mild conditions and does not ordinarily require the presence of a catalyst.

In the second equation a common esterification reaction is involved in which the elements of water are condensed out simultaneously with the formation of the fully esterified (diester) product. This reaction proceeds at a slower rate than the first and requires both higher temperatures and an acid catalyst. In Equation 1 a primary alcohol reacts more rapidly than a secondary alcohol of equal carbon content. However, an appreciable amount of the secondary alcohol does react, providing the reaction period is sufficiently long. In the case of Equation 2, however, the carboxyl group is quite selective and reacts substantially exclusively with a primary alcohol in the presence of secondary alcohols.

Removal of secondary alcohols from, or reduction of their concentration in mixtures thereof with primary alcohols is desirable for a number of reasons. For instance, the major fraction of primary alcohols found in hydrocarbon synthesis oil produces good plasticizers when reacted with phthalic anhydride. It is desirable initially, however, to separate or reduce the concentration of the secondary alcohols in such mixtures since phthalates produced from these mixtures have been found to possess a poor color. Moreover, the extent of the esterification reaction has not been found to be as complete with primary and secondary alcohol mixtures as when pure or substantially pure primary alcohols are used to esterify phthalic anhydride. Even when the secondary alcohols are pure the esterification reaction with phthalic anhydride proceeds much more slowly than with primary alcohols of comparable quality. Moreover, either with primary and secondary alcohol mixtures, or with the substantially pure secondary alcohols, appreciable dehydration of the latter to the corresponding olefins occurs when being reacted with phthalic anhydride to produce the fully esterified product. Thus, in addition to the fact that reaction with the secondary alcohols is slower than with the primary alcohols of the same carbon content, the ultimate yield of ester that can be expected from a secondary alcohol is necessarily less than that possible in the case of a primary alcohol.

Accordingly, it is an object of my invention to recover a concentrated stream of primary alcohols from a mixture thereof with secondary alcohols, particularly from mixtures of alcohols found in the hydrocarbon phase produced during hydrocarbon synthesis. It is another object of my invention to provide a method for obtaining primary alcohol diesters of phthalic acid from mixtures consisting chiefly of primary and secondary alcohols, particularly those alcohols which are in the $C_6$ to $C_8$ molecular weight range.

Based on the characteristic properties of primary and secondary alcohols briefly outlined above, I have developed a process for separating or concentrating primary alcohols present in mixtures with secondary alcohols. Such mixtures may either be difficult to separate into the desired primary or secondary alcohol fractions by means of distillation, or, for purposes of expediency, it may be entirely satisfactory to utilize said mixtures under conditions favoring selective reaction of the primary alcohol in the presence of the secondary alcohol. Thus, in carrying out my invention I first prepare the monoester of phthalic acid and a primary alcohol to give a product which consists of the substantially pure primary alcohol monoester. Generally speaking, this primary alcohol corresponds to the one present in the mixture to be separated. However, a different primary alcohol may be used for this purpose. Also, if the recovery of a stream of mixed primary alcohols is not objectionable my process can be applied to mixtures of secondary alcohols containing more than a single primary alcohol. The conditions under which the reaction involved in preparing the monoester are well known and need not be described in detail here. It is believed to be sufficient to state that no extraneous solvent is ordinarily necessary and that the reaction generally proceeds at temperatures of about 125° and 175° C. depending, of course, on the boiling point of the primary alcohol present. The monoester is then added to the mixture from which it is desired to recover the primary alcohol, the ester being used in equimolecular proportions with respect to the primary alcohol or alcohols present. The selective reaction of the monoester with the primary alcohol then proceeds in the presence of a suitable acid catalyst, such as sulfuric acid, and at a reaction mixture temperature in the neighborhood of 125° to 175° C., again depending on the boiling point of the primary alcohols present. A suitable entraining agent, such as toluene, may be used where the reaction mixture temperature is insufficient to force the water of reaction out of the system. After the esterification reaction is complete the temperature of the reaction mixture is increased so as to drive the unreacted alcohols, which are chiefly secondary alcohols, overhead. The product phthalates obtained as a residue may then be subjected to further concentration and purification steps such as, for example, treatment with decolorizing carbons, and used as plasticizers, vacuum pump oils, etc. If desired, substantially pure primary alcohol, if only a single primary alcohol was present in the mixture treated, may be secured from the product phthalate by alkaline hydrolysis and subsequent distillation of the liberated alcohol in a known manner. Similarly, a stream consisting essentially of primary alcohols can be secured when a mixture of secondary alcohols and more than one primary alcohol is treated in accordance with the process of my invention.

My invention will be further illustrated by reference to the following example:

*Example*

Phthalic anhydride and pure 1-octanol are reacted in substantially equimolecular quantities at about 125° C. to produce 1-octyl hydrogen phthalate. Thereafter, 4225 grams of the resulting product is mixed with 2902 grams of a mixture of primary and secondary alcohols (1-octanol and 2-octanol) of which 67.2 weight percent is primary alcohol. To this is then added about 15 grams of sulfuric acid and about 1 liter of toluene. This mixture is next placed in a suitable reaction vessel equipped with a fractionating column and heated to a reaction mixture temperature of about 160°–170° C. Water produced during the esterification step is withdrawn overhead in the form of an azeotrope with toluene. This distillate is allowed to settle into two layers after which the toluene layer is returned to the column. The water layer is rejected from the system. After the esterification reaction appears to be complete, as evidenced by the failure of additional water to separate in the distillate, the toluene is driven off and the unreacted alcohol fraction boiling in the range of about 175° to about 200° C. collected. Analyses of this fraction indicates 2-octanol to be present in a concentration corresponding to about 67 percent. Product phthalate amounting to about 5850 grams and consisting chiefly of primary alcohol phthalates together with a minor amount of the unconverted monoester are taken from the reaction vessel and subjected to hydrolysis with caustic to liberate the octyl alcohols. The latter are recovered in a known manner to give a major fraction containing 92 weight percent primary alcohols.

From the foregoing description it will be evident that the process of my invention is highly suitable for the preparation of primary phthalic acid diesters from primary and secondary alcohol mixtures. While the applicability of my process to alcohol mixtures of the type found in the hydrocarbon phase produced by hydrocarbon synthesis has been particularly stressed herein, it is to be understood that my invention applies equally well to mixtures of similar primary and secondary alcohols derived from other sources.

I claim:

1. In a process for separating primary alcohols from a mixture thereof with secondary alcohols, said mixture boiling over a range from about 125° to about 175° C., the improvement which comprises adding to said mixture a primary alcohol hydrogen phthalate, in which said primary alcohol corresponds in carbon content to that of a primary alcohol in said mixture, thereafter subjecting said phthalate to further esterification in the presence of an acid catalyst whereby the primary alcohol component of said mixture reacts with said phthalate substantially to the exclusion of the secondary alcohol component to produce the primary alcohol diester of phthalic acid, and recovering said diester in the form of a residue by subjecting the resulting reaction mixture to distillation.

2. The process of claim 1 wherein the mixture of alcohols employed consist essentially of $C_5$ to $C_8$ alcohols and the primary alcohol employed to prepare said hydrogen phthalate has from 5 to 8 carbon atoms.

3. The process of claim 1 in which the diester is thereafter subjected to hydrolysis and the resulting liberated primary alcohol recovered.

4. The process of claim 1 wherein the primary alcohol used to prepare said hydrogen phthalate is 1-octanol and said mixture is composed of 1-octanol and 2-octanol.

5. The process of claim 1 wherein the mixture of alcohols employed is derived from hydrocarbon synthesis.

References Cited in the file of this patent

UNITED STATES PATENTS

| | | |
|---|---|---|
| 1,689,762 | Adams et al. | Oct. 30, 1928 |
| 2,072,806 | Wood | Mar. 2, 1937 |
| 2,673,222 | McAteer et al. | Mar. 23, 1954 |
| 2,820,771 | Passedouet | Jan. 21, 1958 |